(12) United States Patent
Bermudez Rodriguez et al.

(10) Patent No.: US 10,832,017 B2
(45) Date of Patent: *Nov. 10, 2020

(54) TRACKING OBJECTS IN A TWO DIMENSIONAL SPACE

(71) Applicant: INTERNATIONAL BUSINESS MACHINES CORPORATION, Armonk, NY (US)

(72) Inventors: Sergio A. Bermudez Rodriguez, Boston, MA (US); Hendrik F. Hamann, Yorktown Heights, NY (US); Levente Klein, Tuckahoe, NY (US); Theodore G. van Kessel, Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,384

(22) Filed: Feb. 11, 2019

(65) Prior Publication Data

US 2019/0171852 A1 Jun. 6, 2019

Related U.S. Application Data

(63) Continuation of application No. 15/145,019, filed on May 18, 2016, now Pat. No. 10,296,768.

(51) Int. Cl.
*G06K 7/10* (2006.01)
*G06Q 10/08* (2012.01)

(52) U.S. Cl.
CPC ..... *G06K 7/10099* (2013.01); *G06K 7/10009* (2013.01); *G06Q 10/087* (2013.01)

(58) Field of Classification Search
None
See application file for complete search history.

(56) References Cited

U.S. PATENT DOCUMENTS 5,203,628 A * 4/1993 Hamm ............... B28C 9/0454
366/2
5,686,902 A * 11/1997 Reis ...................... G01S 13/74
340/10.2

(Continued)

FOREIGN PATENT DOCUMENTS

WO 2006/044178 A1 4/2006
WO 2009/132019 A2 10/2009
WO 2012/019645 A1 2/2012

OTHER PUBLICATIONS

Li, N. et al., "Performance-based evaluation of RFID-based indoor location sensing solutions for the built environment" Advanced Engineering Informatics (2011) pp. 535-546, vol. 25.

(Continued)

*Primary Examiner* — John F Mortell
(74) *Attorney, Agent, or Firm* — Tutunjian & Bitetto, P.C.; Anthony Curro

(57) ABSTRACT

A method for tracking objects in a two-dimensional space includes first tracking devices that are activated to read tagged objects within the reading ranges of the first tracking devices. Second tracking devices are activated to read tagged objects within the reading ranges of the second tracking devices. The tagged objects read by each first tracking device are compared to the tagged objects read by each second tracking device, and based on the locations of the tagged objects read by the first and second tracking devices, the locations of the tagged objects are determined.

20 Claims, 12 Drawing Sheets

(56) References Cited

U.S. PATENT DOCUMENTS

| | | | |
|---|---|---|---|
| 5,952,922 A * | 9/1999 | Shober | G01S 13/756 340/572.4 |
| 7,817,014 B2 * | 10/2010 | Krishna | G06K 17/0029 340/10.4 |
| 9,056,396 B1 * | 6/2015 | Linnell | G05B 19/427 |
| 10,703,569 B2 * | 7/2020 | McNeilus | B28C 5/4251 |
| 2002/0175805 A9 * | 11/2002 | Armstrong | G06K 7/10316 340/10.31 |
| 2005/0174879 A1 * | 8/2005 | Bentley | B28C 7/022 366/3 |
| 2006/0252521 A1 * | 11/2006 | Gururajan | A63F 1/00 463/29 |
| 2007/0060311 A1 | 3/2007 | Rowe et al. | |
| 2008/0180250 A1 | 7/2008 | Steil | |
| 2008/0303901 A1 * | 12/2008 | Variyath | H04N 5/77 348/143 |
| 2009/0167495 A1 * | 7/2009 | Smith | G06K 19/07703 340/10.1 |
| 2009/0325686 A1 | 12/2009 | Davis et al. | |
| 2011/0140861 A1 * | 6/2011 | Amir | G01S 13/825 340/10.3 |
| 2013/0049925 A1 * | 2/2013 | Subramanian | G06K 7/10079 340/3.1 |
| 2013/0065679 A1 | 3/2013 | Gelman et al. | |
| 2014/0269145 A1 * | 9/2014 | Fasana | B28C 5/4237 366/41 |
| 2015/0174476 A1 | 6/2015 | Morichau-Beauchant et al. | |
| 2015/0312517 A1 * | 10/2015 | Hoyt | G11B 27/19 386/226 |
| 2016/0034731 A1 * | 2/2016 | Lin | A61B 5/0026 340/10.1 |
| 2017/0221192 A1 * | 8/2017 | Hyre | H04N 7/181 |
| 2020/0013285 A1 * | 1/2020 | Wang | G08G 1/133 |

OTHER PUBLICATIONS

List of IBM Patents or Patent Applications Treated as Related dated Feb. 11, 2019.

\* cited by examiner

Activate a first group of tracking devices in the array to read the identifying data of the objects located within the reading ranges of the tracking devices of the group
210

Activate a second group of tracking devices in the array to read the identifying data of objects located within the reading ranges of the tracking devices of the second group, the tracking devices of the first group and the tracking devices of the second group being dissimilar
215

Compare objects identified by each tracking device of the first group to objects identified by each tracking device of the second group. Objects identified by two or more tracking devices, e.g., a tracking device of the first group and a tracking device of the second group, are then identified
220

Determine the location of the objects in the two dimensional space read by tracking devices, based on the locations and reading ranges of the tracking devices that read the objects
225

FIG. 7

TRACKING OBJECTS IN A TWO DIMENSIONAL SPACE

BACKGROUND

Technical Field

The present disclosure relates to methods and systems for locating and tracking objects in a two dimensional space. In particular, the method and system locate and track objects with radio-frequency identification (RFID) readers.

Description of the Related Art

RFID technology uses electromagnetic fields to identify and track tags attached to objects. A RFID tag contains electronically-stored information that uniquely identifies the tag, and by extension the object with which the tag is associated.

In an application of passive RFID technology, a RFID reader emits radio frequency energy to energize a RFID tag in range of the reader. The energy received by the RFID tag charges and energizes its circuits. When a sufficient amount of energy has been received, the RFID tag emits a radio signal transmitting an encoded identification number that is detected by the receiver. The receiver decodes the transmitted identification number and reads it.

A drawback of RFID technology is that the passive reading of a RFID tag provides little to no information on the location of the tag and the object to which it is associated. While a reader may have an effective reading range that extends a distance from the reader, not much can be learned regarding the location of the tagged object with respect to the reader.

SUMMARY

In one embodiment, the present disclosure provides a method for tagging and tracking objects in a two dimensional space. In the method, first tracking devices are activated to read tagged objects in the space that are within the reading ranges of the first tracking devices. The first tracking devices have non-overlapping reading ranges. Second tracking devices are activated to read tagged objects in the space that are within the reading ranges of the second tracking devices. The second tracking devices have non-overlapping reading ranges. The tagged objects read by each first tracking device are compared to the tagged objects read by each second tracking device. The locations of the tagged objects in the two dimensional space read by the first and second tracking devices are determined, based on the locations of the first and second tracking devices that read the tagged objects.

In another aspect of the present disclosure, a system is provided for tagging and tracking objects in a two dimensional space. The system includes one or more processors including memory and radio-frequency identification readers arranged in a selected tracking configuration to read tagged objects that include radio-frequency identification tags. A radio-frequency identification reader controller sequentially activates groups of radio-frequency identification readers in which the readers of a group have non-overlapping reading ranges. A radio-frequency identification data collector matches the tagged objects to the radio frequency identification readers that read the tagged objects. A radio-frequency data analyzer determines the locations of the radio-frequency identification tags based on locations of the radio-frequency identification readers.

In yet another aspect of the present disclosure, a computer program product is described for tagging and tracking objects in a two dimensional space, the computer program product comprising a non-transitory computer readable storage medium having program instructions embodied therewith, the program instructions being executable by a computer to cause the computer to perform a method in which first tracking devices are activated to read tagged objects in the space that are within the reading ranges of the first tracking devices. The first tracking devices have non-overlapping reading ranges. Second tracking devices are activated to read tagged objects in the space that are within the reading ranges of the second tracking devices. The second tracking devices have non-overlapping reading ranges. The tagged objects read by each first tracking device are compared to the tagged objects read by each second tracking device. The locations of the tagged objects in the two dimensional space read by the first and second tracking devices are determined, based on the locations of the first and second tracking devices that read the tagged objects.

In another embodiment, the present disclosure provides a method for tagging and tracking objects in a two-dimensional space. The method includes sequentially activating first tracking devices of a plurality of tracking devices that read tagged objects in the two-dimensional space that are within reading ranges of the first tracking devices, and second tracking devices of the plurality of tracking devices that read tagged objects in the two-dimensional space that are within reading ranges of the second tracking devices. The method further includes comparing data collected from each of the plurality of tracking devices to identify that at least given one of the tagged objects has been read by at least two of the plurality of tracking devices, and determining a location of the given tagged object based on the locations of the at least two tracking devices that read the tagged objects.

In another aspect of the present disclosure, a system is provided for tracking tagged objects in a two dimensional space. The system includes a memory device for storing program code, and at least one processor device operatively coupled to the memory device. The at least one processor device is configured to execute program code stored on the memory device to sequentially activate first tracking devices of a plurality of tracking devices that read tagged objects in the two-dimensional space that are within reading ranges of the first tracking devices, and second tracking devices of the plurality of tracking devices that read tagged objects in the two-dimensional space that are within reading ranges of the second tracking devices. The at least one processor device is further configured to compare data collected from each of the plurality of tracking devices to identify that at least given one of the tagged objects has been read by at least two of the plurality of tracking devices, and determine a location of the given tagged object based on the locations of the at least two tracking devices that read the tagged objects.

In yet another aspect of the present disclosure, a computer program product is provided. The computer program product includes a non-transitory computer readable storage medium having program instructions embodied therewith, the program instructions being executable by a computer to cause the computer to perform a method for tracking tagged objects in a two dimensional space. The method includes sequentially activating first tracking devices of a plurality of tracking devices that read tagged objects in the two-dimensional space that are within reading ranges of the first tracking devices, and second tracking devices of the plurality of tracking devices that read tagged objects in the two-dimensional space that are within reading ranges of the second tracking devices. The method further includes comparing data collected from each of the plurality of tracking devices to identify that at least given one of the tagged objects has been read by at least two of the plurality of tracking devices, and determining a location of the given tagged object based on the locations of the at least two tracking devices that read the tagged objects.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 7 is a block/flow diagram depicting an exemplary embodiment of a method for tracking objects in a two dimensional space in accordance with the present principles;

DETAILED DESCRIPTION

Figure 1:
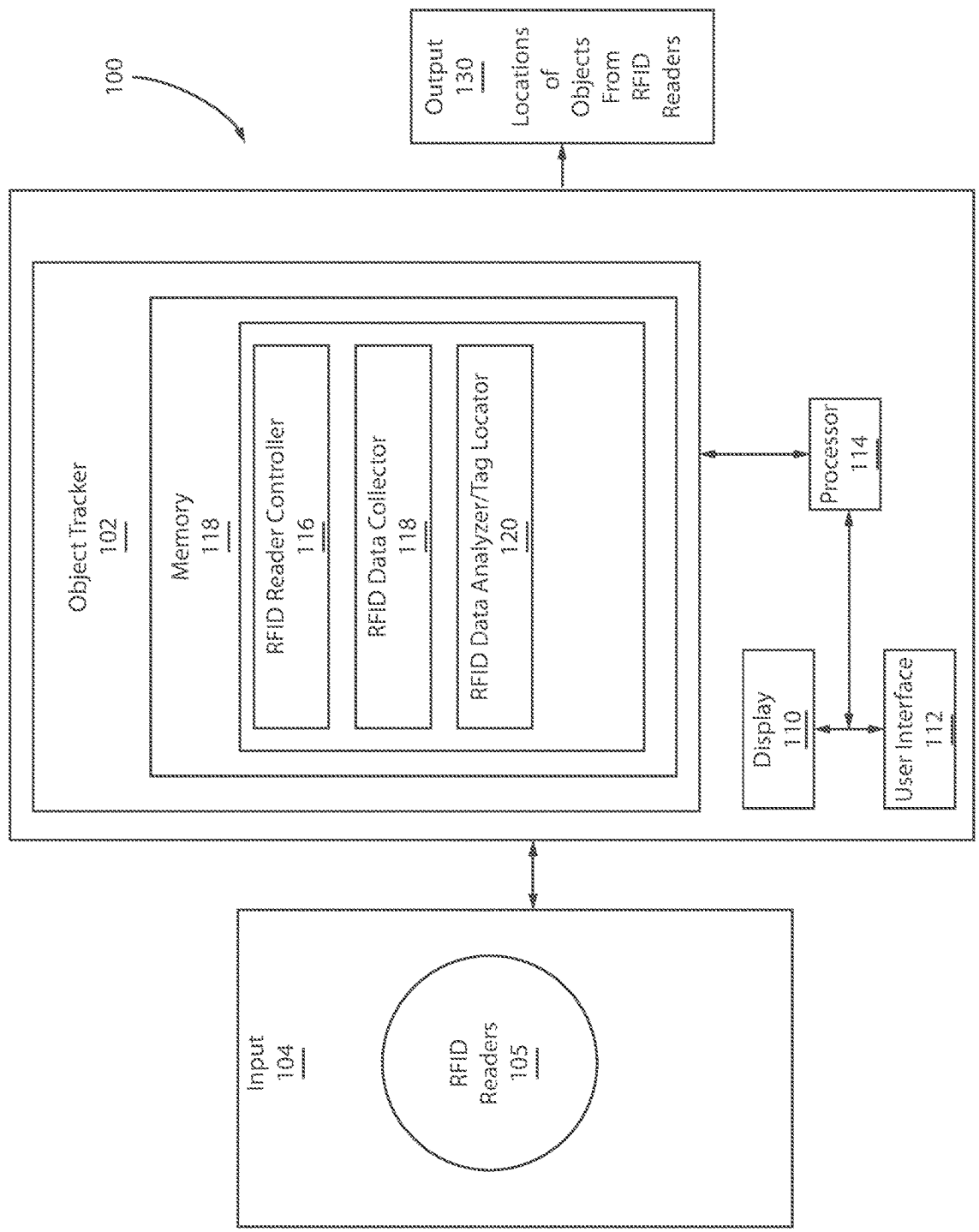
FIG. 1 is a block diagram depicting an exemplary embodiment of a system for tracking objects in a two dimensional space in accordance with the present principles.

According to an embodiment of the present principles, systems, methods and computer program products are described for tagging and tracking objects in a two dimensional space. Objects may move in a two dimensional space, and the movement may be frequent. According to the present principles, the locations of objects are determined in real time, providing up-to-date information on where the object is positioned in the space. As an example, chips used in a game of chance played in a casino or other gaming establishment move continuously during the course of play. Chips may move from player to player, from house to player (and vice versa), and may be cashed out in exchange for the monetary value that the chips represent. It is possible that some persons may try to play a casino game dishonestly. Being able to authenticate gaming chips and to track chip locations in real time in accordance with the embodiments of the present principles may be of benefit to a casino and its managers.

There are other instances in which knowing the locations of objects in real time would be of benefit to individuals and entities. For example, tracking surgical instruments would benefit operating room and medical personnel. Tracking medications would also be of benefit to medical personnel, to pharmacists, and to drug manufacturers and suppliers. In a day care setting, it would be advantageous if, for example, the shoes of young children could be tagged for tracking. Robot tracking of objects would also be advantageous, e.g., the robots could access information on object location that is useful in performing a task. These are just a few examples where location tracking in a two dimensional space provides benefits.

While an RFID reader may have a relatively limited range, e.g., only able to read RFID tags that are within a short distance of the reader, according to embodiments of present principles, an array of RFID readers covering an area corresponding to a two dimensional space may be used to identify and track objects provided with RFID tags, allowing for the identification and location of the object in a two dimensional space. According to one embodiment, RFID readers are provided in a two-dimensional array, e.g., an array of RFID readers configured as a grid. The range of each RFID reader is set to a certain known range, e.g., a reading range. The reading range of each RFID reader in the array overlaps with the reading range of at least one of its neighboring RFID readers. Adjustments may be made to calibrate the reading range or the selected reading distance.

In other aspects of the present disclosure, systems and methods for tagging and tracking objects in a two dimensional space are described in which the tagged objects are provided with light-emitting sources. In one embodiment, circuitry provided in the object is energized by the signal transmitted by an RFID reader or by a light source transmitting a selected activating specific wavelength. The circuitry, when energized by the activating signal sent by an RFID reader (which the object is in range of), activates the RFID tag and the light source. The transmission signal from the RFID tag and emission of light from the light source may be simultaneous. In addition to the two-dimensional array of RFID readers, one or more cameras are provided in association with the array to visually observe the objects and the emissions of light when the circuitry in the objects is powered. Camera distances to the locations in the array are known or can be determined, allowing for the determination of an object's location through the visual information provided in images taken by the cameras. The simultaneous transmissions of light and the signal from the RFID tags, when detected by the cameras and the RFID readers, may provide a more accurate and precise determination of the locations of the objects in the two dimensional space.

Referring now to the drawings in which like numerals represent the same or similar elements and initially to FIG. 1, a system 100 for tracking objects in a two-dimensional space in accordance with an embodiment of the present principles is shown with respect to an operational environment in which it can be utilized. System 100 may be a computer system or computer environment, such as later described herein in conjunction with FIG. 9, that determines the locations of the objects within a two dimensional space. System 100 may be local, e.g., at the site of where objects are being tracked. System 100 may be remotely located, e.g., at a location away from where the objects are being tracked, such as a computing environment located elsewhere in the facility where the objects are being tracked, or the system may be located offsite. System 100 may also be located in a cloud computing environment.

System 100 includes an object tracker 102 that includes one or more processors 114 and memory 108 for storing applications, modules and other data. In one embodiment, the memory unit 108 includes a large number of memory blocks e.g., where calculations and data analysis may be performed. The system 100 may also include one or more displays 110 for viewing content. The display 110 may permit a user to interact with the system and its components and functions. This may be facilitated by the inclusion of a user interface 112, which may include a mouse, joystick, or any other peripheral or control to permit user interaction with the system and/or its devices. It should be understood that the components and functions of the system may be represented as one or more discrete systems or workstations, or may be integrated as part of a larger system or workstation.

System 100 receives input 104 from an array of RFID readers 105. An exemplary array of RFID readers is shown in the schematic views of FIG. 3, FIG. 4 and FIG. 5, which illustrate embodiments for tracking objects in the two dimensional space. In those figures, the RFID readers are assigned component number 172 and the array is assigned component number 170.

Referring back to FIG. 1, the RFID readers 105 transmit identification information to the system associated with the tagged objects when, for example, the signal transmitted by an RFID reader 105 in the array activates an RFID tag included in an object that is within the range of that reader. Such information may be in the form of a list of tags that is generated by each reader.

The system may further have an RFID reader controller 116, which provides for several aspects of the embodiments in accordance with the present principles. For example, the RFID reader controller 116 may store information about the array and the RFID readers within the array, such as the locations of each RFID reader within the array, the distance of each reader in the array from its nearest neighbors, the distance of each reader in the array from the other readers in the array, and the reading range of each reader in the array. From this information, the RFID reader controller 116 may categorize the readers of the array into groups of readers, in which the readers of each group do not have reading ranges that overlap with the reading range of any other reader in that group. The RFID reader controller 116 may manage and control the groups, maintain information on the members of the group, may set up a sequence in which groups are to be activated, may activate of the groups in accordance with the sequence, and may confirm that each reader in the array has been activated, and if confirmation is not found, then take action to insure that each reader has been activated. In one embodiment, the RFID reader controller 116 may configure the groups such that the readers of a group are unique to that group, e.g., the RFID readers 105 of a given reading group are dissimilar to the RFID readers 105 of the other reading groups.

For example, RFID reader controller 116 controls a reading cycle in which RFID readers 105 of a first group are activated to read RFID tags within their reading ranges. The RFID readers 105 of the first group have reading ranges that do not overlap with the reading ranges of the other RFID readers 105 in that group. After reading is completed, e.g., after the signal transmitted by the RFID readers of the first group energizes RFID tags within the reading ranges and the RFID readers receive identifying information transmitted by the energized RFID tags, the RFID reader controller 116 continues the reading cycle by activating RFID readers 105 of a second group to read RFID tags within their reading ranges. The RFID readers 105 of the second group have reading ranges that do not overlap with the reading ranges of the other RFID readers 105 in the second group. The RFID reader controller 116 continues the reading cycle by activating groups of RFID readers 105 until all RFID readers 105 in the array have been activated and have read within-range RFID tags.

When RFID readers 105 are activated by the RFID reader controller 116, RFID tags that are in range of RFID readers 105 are activated and transmit unique identification data contained in the RFID tags to the RFID readers 105, which then transmit the data to the object tracker 102, where the data is collected and analyzed in the RFID data collector 118. The reading of the RFID tags by the RFID readers 105 may be time stamped. In one embodiment, the RFID data collector 118 may perform the time stamping.

The RFID data collector 118 collects the data received from RFID readers. The data may include the identities of the RFID tags that were read during the reading process, with each RFID tag sending its own unique identification data to the RFID readers, which then send this information to system 100, where it arrives in the RFID data collector 118. The data may also include identifying and location information on the RFID readers that read the tags. RFID data collector 118 matches the tagged objects to the RFID readers that read the tagged objects. The information received by the RFID data collector 118 may be in a list form, e.g., a list of tag identities read by each reader. If the information is not received in a list form, then the RFID data collector 118 may compile lists of the tags read by each RFID reader 105.

The RFID data analyzer 120 reviews RFID tag identities that have been read by one or more RFID readers 105 in preparing to make location determinations for the RFID tags. The RFID data analyzer 120 may find that an RFID tag may have been read by two or more RFID readers 105, e.g., two or more readers activated during the reading cycles. The RFID data collector 120 may arrive at this finding by comparing the data collected by each RFID reader 105 of the array. When the RFID data analyzer 120 finds an RFID tag that has been read by two or more RFID readers 105, then the location of the RFID readers is determined based on the locations of the RFID readers 105, which location information may be stored in the RFID reader controller 116. By determining the location of an RFID tag, the location of the object having the RFID tag may also be determined. In one embodiment, where two RFID readers 105 have read the same RFID tag, the RFID data analyzer makes the location determination based on the location of one RFID reader, the location of the other RFID reader, and the distance between the two readers. In one embodiment, the RFID data analyzer 120 determines the RFID tag to be at a location that is the mean distance between the two RFID readers.

The RFID data analyzer 120 may compare the information gathered by RFID readers 105 in making object location determinations, for example, looking for instances where an RFID tag is read by two or more RFID readers 105. When an RFID tag is read by two or more RFID readers 105 (which, as indicated the above, may belong to different groups of RFID readers), then the location of the RFID tag, and by extension, the object having the RFID tag, is determined to be near the RFID readers that read the RFID tag, e.g., at a location that is the mean distance between the two RFID readers. In the situation where an RFID tag appears on only one RFID reader list, then the object associated with the tag is determined to be located proximate to the reader.

The RFID data analyzer 120 generates the determination of the location of the RFID tag, and by extension the object that includes the RFID tag, as system output 130.

Figure 2:
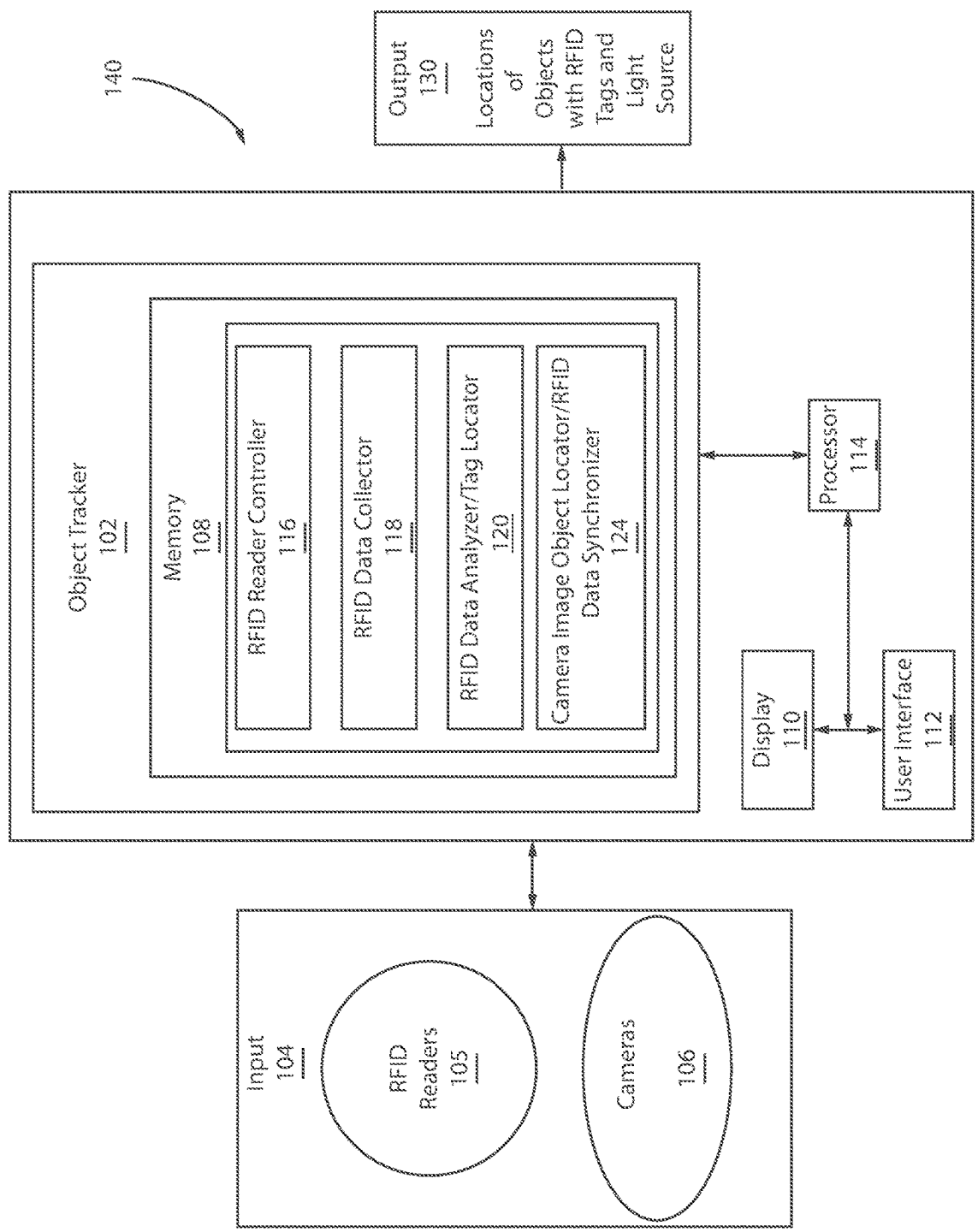
FIG. 2 is a block diagram depicting another exemplary embodiment of a system for tracking objects in a two dimensional space in accordance with the present principles.

FIG. 2 depicts an alternate system embodiment 140 for tracking objects in a two-dimensional space in accordance with another embodiment of the present principles. System 140 includes components 102, 104, 108, 110, 112, 114, 116, 118, and 120 of system 100, which operate as described above in regard to system 100. The above description of those components is relied on herein.

In addition to receiving the input described above from RFID readers 105, system 140 additionally receives visual information transmitted to the system as input from cameras 106. Cameras 106 may be configured in the arrangement described in relation to FIG. 5, where cameras are assigned the component number 180. The cameras 180 of FIG. 5 visually track objects that may include illuminating light sources, e.g., objects 178 provided with light sources 188. The objects may be as described in relation to FIG. 6, in which a circuit, upon activation, powers an RFID tag 186 and a light source 188.

Referring back to FIG. 2, the visual information received by the system as input may be images taken by cameras 106 that have a view of the two dimensional space in which the objects are being tracked. In one embodiment, the cameras 106 capture images of illuminating light sources in the objects. The light-emitting source may be illuminated by the activating energy provided by an RFID reader 105, which activating energy also activates the RFID transmitter within the RFID tag. In this arrangement, the illumination of the light source and the transmission of the signal by the RFID tag may be simultaneous. The light emissions are captured in images the cameras 106, and the emissions may be simultaneous with the activation of the RFID tag signal and the reading of same by the RFID reader 105.

The images may be video images, in which instance the cameras 106 capture video. In another embodiment, the images 106 may be still images, in which instance the cameras 106 capture still images. The images may be time stamped, e.g., by the cameras 106, indicating the time at which the images were taken, or by the camera image object locater/RFID data synchronizer 124. Further, the reading of the RFID tags by the RFID readers 105 may be time stamped at the time of transmission or at the time the information is received by the object tracker 102, such as by the RFID data collector 118.

The cameras 106 may be calibrated in order to provide an indication of the distance between a camera and an object in the two dimensional space, that, for example is emitting light from a source that was activated by the activating energy provided by the RFID reader. In one embodiment, the distance determination accounts for the difference in height and linear distance between the camera 106 and the objects tracked in the two-dimensional space. The correlation of the data obtained by the RFID readers and the image data captured by the cameras 106 may lead to more accurate determinations of object locations.

As stated, the input controller 116, the RFID data collector 118 and RFID data analyzer/tag locator 120 will operate in system 140 as indicated in the description of system 100. System 140 is further provided with a camera image object locater/RFID data synchronizer 124, which receives the camera image data from cameras 106, including images of the objects when illuminated. The camera image object locater/RFID data synchronizer 124 may also store the above-described information concerning the distance between cameras 106 and an object that, for example, is emitting light from a source that was activated by the activating energy provided by the RFID reader.

The camera image object locater/RFID data synchronizer 124 may make a visual determination of the distance of the illuminating object from the camera 106 based on the stored distance information, e.g., the distance information between the camera, e.g., the camera lens and the location in the two dimensional space where the illuminating object is positioned. Such a determination may be expressed in a Cartesian coordinate system, or in another embodiment, it may be expressed in a polar coordinate system.

Having made a visual determination of the location of the illuminating object, the camera image object locater/RFID data synchronizer 124 may then summon the location determination of the objects made by the RFID data analyzer 120 to provide a location determination based on a combination of the image data and RFID location data. By comparing the identity of an RFID tag activated by one or more RFID readers, and the illuminations of the object containing that RFID tag and the times at which activation and illumination occurred, the camera image object locater/RFID data synchronizer 124 may combine the visual determination of object location with the RFID location determination to more precisely and accurately determine the position of an object in the two dimensional space. The determinations made by the camera image object locater/RFID data synchronizer 124 may generated as system output 130.

Figure 3:
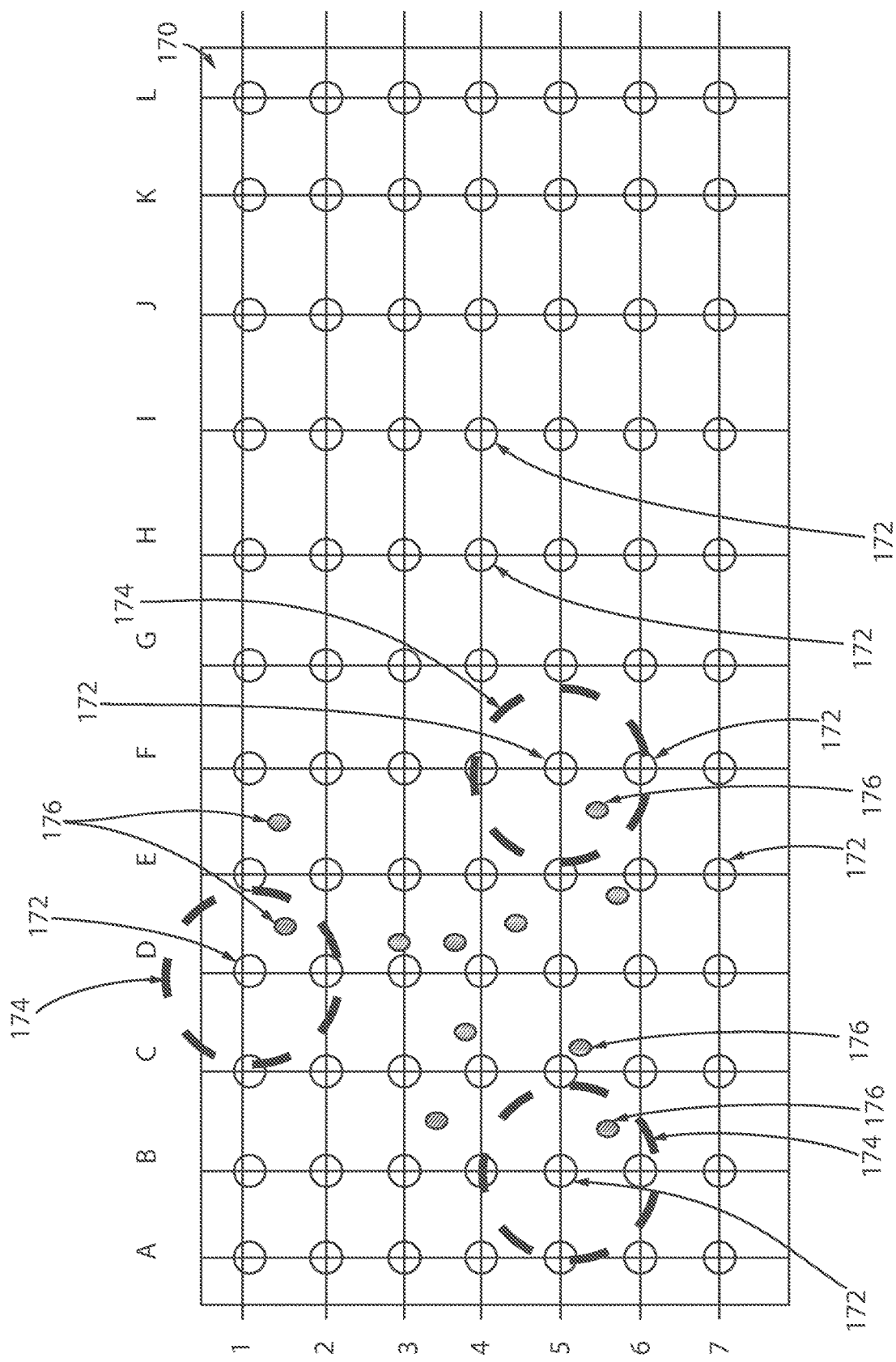
FIG. 3 depicts a schematic view of an exemplary embodiment in which objects are tracked in a two dimensional space with a first group of RFID readers in accordance with the present principles.

FIG. 3 depicts a view of a two dimensional array 170 formed of RFID readers 172. For the sake of simplicity, only a few exemplary readers are numbered. The exemplary array includes an 11×7 grid arrangement of RFID readers 172 spaced equidistant from each other in a row-column arrangement. The columns are designated with a letter from A to L and the rows are designated with a number from 1 to 7. In this exemplary configuration, each reader 172 is located at a node that is an intersection of a row and column. The range of each reader 172 is known and determined, with each reader having a range that overlaps with at least one of the readers that are its closest neighbors. With the range of each reader being known, it is possible to place the readers into groups in which the reading range of each reader in the group does not overlap with the other readers in the group. The groups may be constituted of a number of RFID trackers with non-overlapping reading ranges. The groups may be constituted of only a single reader, in which case each reader of the array is a group. RFID readers 172 may be those used in the object tracker system 100 described above in relation to FIG. 1.

The arrangement shown in the figure is merely exemplary. The system operator may configure the array of readers in any number of arrangements with any number of readers and any number of configurations that effectively map and cover a two-dimensional space. In one embodiment in accordance with the present principles, every possible location of the two-dimensional space is covered by at least two RFID readers. For example, the arrangement is configured so that every possible location of the two-dimensional space is within the range of at least two RFID readers. Also, while the RFID readers are arranged in squares within the array while the arrangement of FIG. 3, other configurations are possible, such as arranging the readers into hexagons, triangles, trapezoids, etc.

In one embodiment, the two-dimensional space 170 is a surface on which RFID-tagged objects can move about. In one embodiment, the RFID readers 172 are located under the surface 170 on which the RFID-tagged objects will be used. While surface 170 is shown as being transparent, it should be understood that other arrangements are possible. In one exemplary embodiment, the surface is a gaming table on which a game of chance is played, such as a poker table, a blackjack table, a roulette table, a craps table, etc. In such an embodiment, the presence of the RFID readers may be surreptitious, e.g., located under the surface of the gaming table, and do not interfere with the activity taking place on the surface.

Objects 176 equipped with RFID tags move about the surface 170 and are tracked by the RFID readers 172. Such movement may result from people moving objects around the surface, such as people wagering on a casino game with RFID-tagged chips that represent a monetary amount, with the chips being moved about the gaming table surface by the players and by the person running the game for the casino. The gaming chips 176 are each provided with an RFID tag that is affixed to the chip. The RFID tag, when activated by the signal from a reader 172, transmits an identifying signal that may be unique to the chip, e.g., a signal unique to that chip not duplicated by the other chips. The unique identifying signal may contain other information about the chip, such as the chip denomination, e.g., the monetary amount that the chip represents. In another embodiment, the unique identifying signal alone is transmitted by the chip, and other information associated with the unique identifying signal, such as chip denomination, is stored in a database.

Each of the readers 172 has a known reading range 174, e.g., a reading range that extends outward from the reader. The RFID readers of the group have reading ranges that do not overlap with the reading ranges of any other reader of the group. Upon activation, the RFID readers 172 emit radio frequency energy to energize an RFID tagged object 176 in range of the reader. When in the range, the RFID tags are energized and transmit a signal that is read by the RFID readers 172 within the range of the tagged object 176. The range can be assured in one embodiment by adding an additional light emitting element or a photoelectric element that would translate RF signal to electric power. The light can be activated once the RFID reader queries the tags in range or it may be activated by a light pulse on a specific wavelength.

The dashed circles 174 depict reading ranges of the RFID readers 172. The ranges 174 of the RFID readers correspond to a sensitivity in which the reader 172 is most sensitive to objects 176 that are closer to it and less sensitive when the object is located further away from the reader 172.

As shown, the readers 172 are activated in non-overlapping transmission ranges. In one embodiment, a group of two or more readers 172 are activated in non-overlapping transmission ranges. As shown in FIG. 3, three readers B5, D1, and F5 are activated. As seen from the circles 176 representing reading ranges, the reading ranges do not overlap, e.g., the signals of the readers do not overlap.

Within the reading ranges for the readers B5, D1, and F5, there are objects 176, e.g., chips that fall within the ranges for the readers. The RFID tag of each object 176 within a range of a reader is activated by the signal sent by that reader. In reply, the activated RFID tag transmits an identifying signal that is read by that reader. The readers B5, D1, and F5 identify the within-range RFID tags, and by extension, the associated objects, based on the unique identifying information transmitted by the tags. The readers B5, D1, and F5 may transmit the identity of the tags to a computer system, such as by wireless communication system, for further processing.

Figure 4:
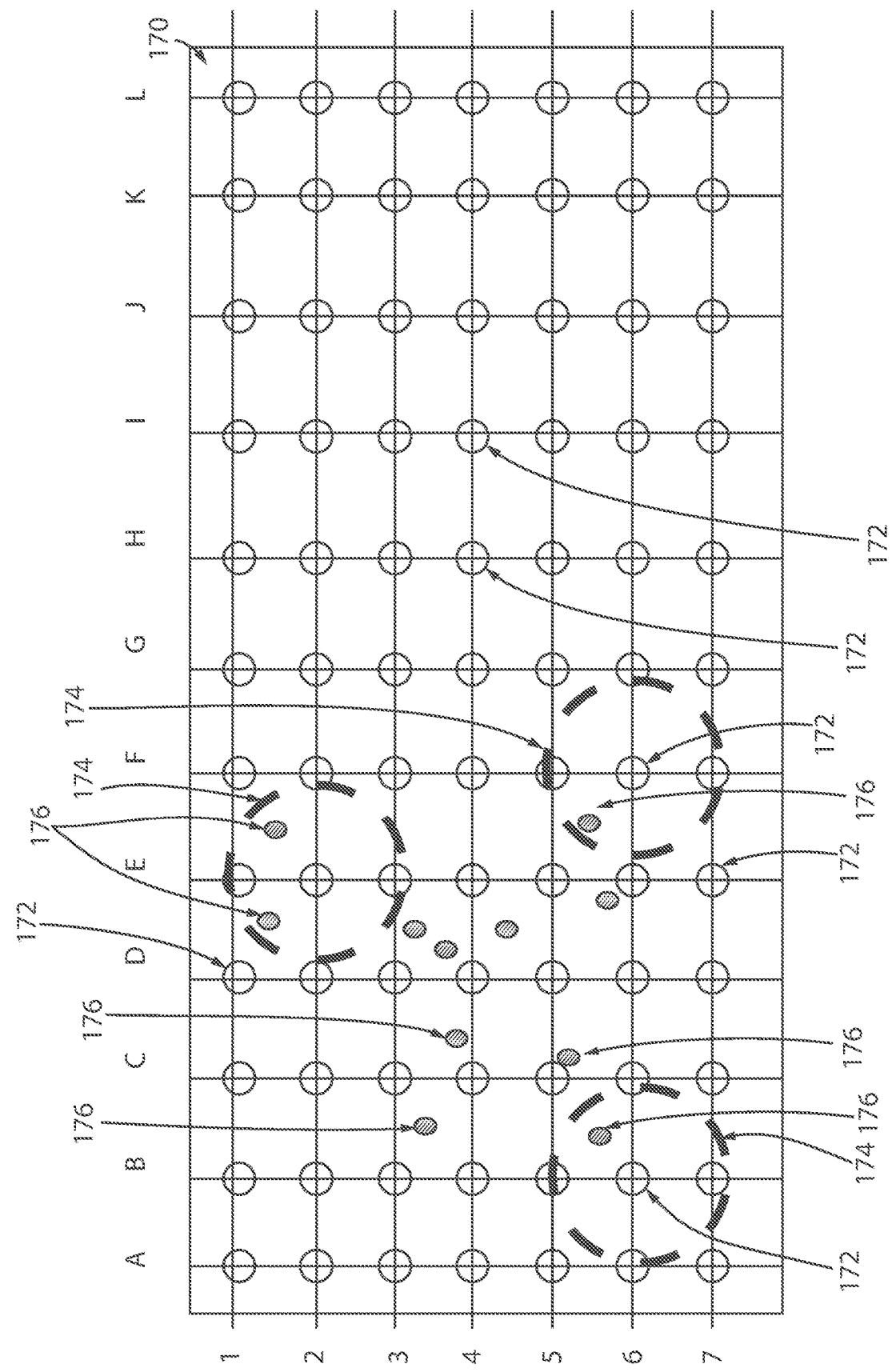
FIG. 4 depicts a schematic view of an exemplary embodiment in which objects are tracked in a two dimensional space with a second group of RFID readers, e.g., a different group than that of FIG. 3, in accordance with the present principles.

FIG. 4 depicts the objects 176 as being located essentially as they are in FIG. 3. In FIG. 4, the readers B5, D1, and F5 are deactivated and readers B6, E2 and F6 are activated. As seen from the circles 176 representing reading ranges of readers B6, E2 and F6, the reading ranges do not overlap, e.g., the signals of the readers do not overlap. On the other hand, there is overlap between reading ranges of the FIG. 4 group and the FIG. 3 group: the reading range of B5 overlaps the reading range of B6; the reading range of D1 overlaps the reading range of E2; and the reading range of F5 overlaps the reading range of F6. The RFID tag of each object within a range of a reader is activated by the signal sent by that reader and in reply the activated RFID tag transmits its identifying signal that is read by that reader. The readers B5, D1, and F5 may transmit the identity of the tags to a computer system, such as by wireless communication system, for further processing.

The identity of the tags read by the readers B5, B6, D1, E2, F5 and F6 are compared. Such a comparison may be made by the computer system. In the example of FIG. 3 and FIG. 4, it is determined that: the chip located on the grid between B-C/5-6 is read by readers B5 and B6; the chip located on the grid between D-E/1-2 is read by readers D1 and E2; and the chip located on the grid between E-F/5-6 is read by readers F5 and F6.

Through activating readers as exemplified in FIG. 3 and FIG. 4, a determination of the location of an object provided with an RFID tag can be determined, e.g., estimated. In one embodiment, the RFID tag-including object may be determined to be a location that is the mean distance between the RFID readers that read its tag. For example, the chip located on the grid between D-E/1-2 is determined to be located at the mean distance between readers D1 and E2. In the situation where an RFID tag appears on only one RFID reader list, then the object associated with the tag is determined to be located proximate to the reader.

The activation of groups of readers 172 may occur in sequences of groups of readers that do not have overlapping ranges. In one embodiment, each reader is activated at least once. In one other embodiment, groups of readers that to not have overlapping ranges may be activated simultaneously. The computer system may configure the most efficient way to activate the readers. In one embodiment, the number of groups of readers may minimized, such as by including, within the groups, the maximum possible number of readers with reading ranges that do not overlap. In yet another embodiment, each reader is a group, and in this arrangement, each reader is activated and queried singularly and sequentially.

It should be understood that tracking the tagged objects may occur continuously and in real time, such as for example as long as the two dimensional space is in use. For example, for as long as there is gaming action on a table, the above methodology of determining the locations of tagged objects may be engaged in continuously, to provide real time location information for the tagged objects.

In one exemplary embodiment, the readers 172 may have a range corresponding to a full grid space in all directions (e.g., 360° of grid space around each sensor), which overlaps with the reading ranges of the nearest neighboring readers.

In one embodiment, the readers 172 compile lists containing the unique identities of the RFID tags that they have read, and transmit those lists to a computer system. The lists compiled by the readers are then compared. When the identification information for an RFID tag appears on the list of more than one reader, a location determination for the RFID tag is made. In one embodiment, the tag, and by extension the object bearing the tag is determined to be on the table in the overlapping RFID reading ranges for the readers that read the tag and the tag is determined to be positioned at the mean distance between the readers that listed the RFID tag information.

In one embodiment the readers are configured in an arrangement in which they are close together, which may have the effect increasing the extent of the overlap between nearby readers. By increasing the extent of overlap, the mean distance determinations may increase in accuracy. In one other embodiment, increasing the number of readers and decreasing the range of each reader may also increase the accuracy and reliability of the location determinations made by the readers.

Reading ranges may be adjusted in accordance with the specifications of the system user. For example, providing readers with shorter ranges may yield more accurate determinations of object locations than arrangements in which the readers have longer ranges.

Figure 5:
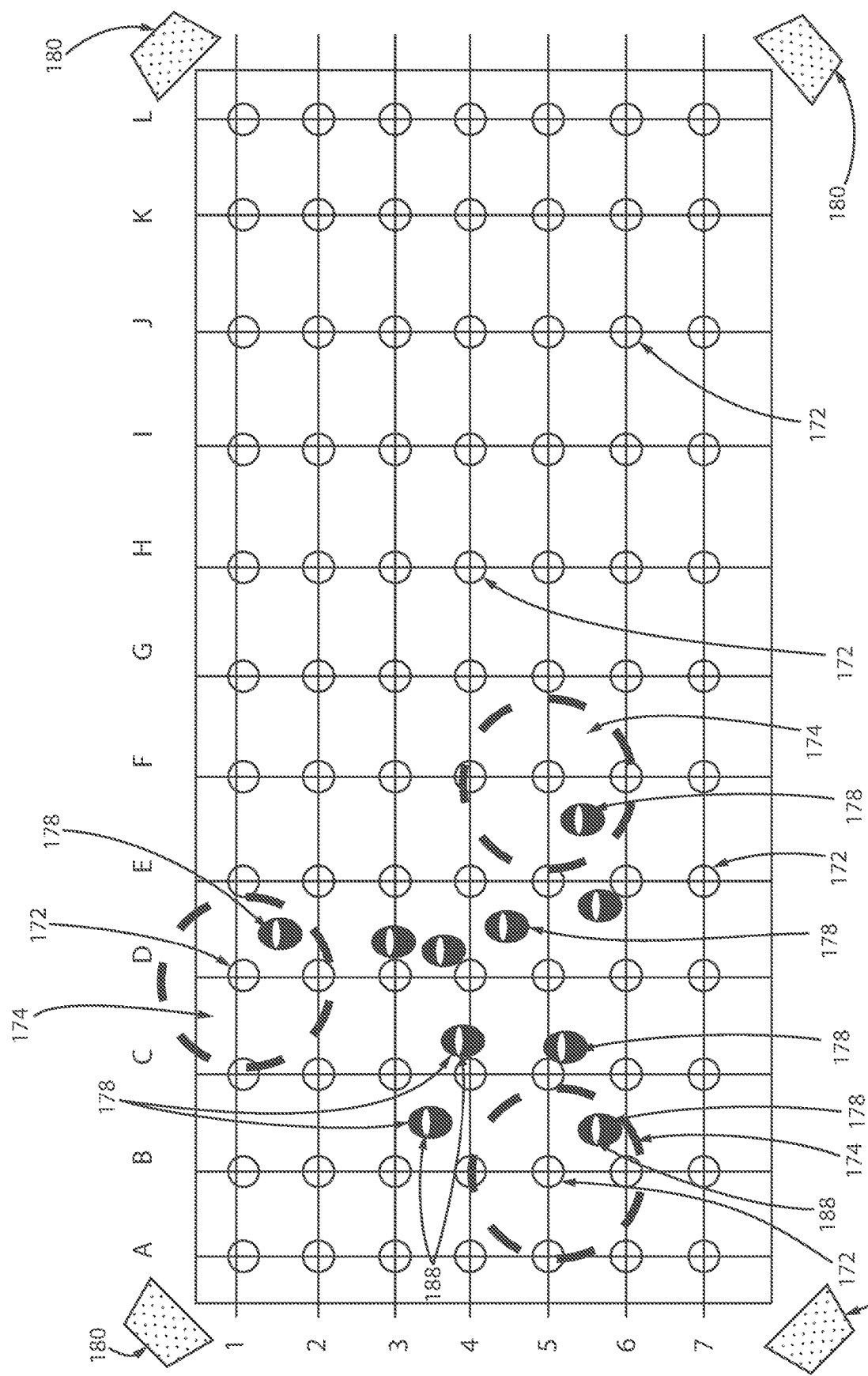
FIG. 5 depicts a schematic view of an exemplary embodiment of tracking objects in a two dimensional space that employs RFID readers and cameras in accordance with the present principles.

FIG. 5 shows another embodiment which uses RFID readers 172 positioned near a two dimensional space 170, e.g., a surface, and cameras 180. The RFID readers 172 have reading ranges 174 as before described. Here, in addition to carrying RFID tags, the objects 178 include light emitting sources 188 that are located on or in the objects. Cameras 180 are positioned at observational viewpoints of the surface to have a full and complete view of same. The cameras are shown as being positioned at the corners of the surface 170 and the array of RFID readers 172. The cameras 180 provide the capability of visually observing light-emitting objects that are on the surface from one or more vantage points, depending on the number of cameras employed. In one embodiment, each camera has a full and complete view of the two-dimensional surface. As shown in the figure, the cameras are located at four (4) vantage points, though other arrangements are possible. In one embodiment, the cameras may be video cameras. In another embodiment, the cameras capture still images. The readers 172 are configured in a grid configuration as described above. Using a multiple camera arrangement may provide more precise position determination for the objects, and improves the likelihood that the object emitting light is visible when objects are stacked or there are other objects that may possibly be view-obstructing. The RFID readers 172 and cameras 180 may be used in the object tracking system 140 described in relation to FIG. 2.

In one embodiment, the cameras 180 capture images that are synchronized with the RFID readers 172. The circuitry within the objects is activated by the signal transmitted by the RFID readers. The circuitry powers the RFID tags and the light emitting sources. The light emitted by the sources 188 within the objects 178 is detected by the cameras 180 at the same time the identities of the RFID tags within the objects 178 are read by the RFID readers 172. In this embodiment in accordance with the present principles, the location of an object in the two dimensional space be determined by RFID tracking and from visual information captured by one or more cameras. This may provide greater accuracy in determining the locations of the objects. An identification approach using RFID and cameras may increase the reliability of location determinations.

The light sources 188 within the objects 178 may be configured to emit light in an identifying pattern that is detectable by the cameras 180. For example, the light sources may blink and pulse in a discernible pattern, such as one based on Morse code. Each object may be configured to emit light in its own unique discernable pattern. In this arrangement, patterned light emission is, in its own sense, a unique object identifier.

Further, cameras 180 may be calibrated in order to provide a determination on the distance between the camera, e.g., the camera lens, and an object that is emitting light. In one embodiment, the distance determination is a linear distance determination that accounts for the difference in height between the camera lens and the two-dimensional space on which the objects are located. By determining linear distances, and having information on the spatial configuration of the array of RFID readers, the accuracy of the correlation between the data obtained by the RFID reader and the image captured by the camera image be improved.

The number of cameras and the camera locations may be configured by the system user. Increasing the number of cameras may improve the accuracy of the visual determinations of object locations, such as for example, when objects are provided in a stack. While FIG. 5 shows cameras 180 located on the corners of the two dimensional space, they may be located anywhere on the perimeter of the space, over the space, under the space, and in any combination thereof. In one embodiment in accordance with the present principles, the RFID readers and cameras are configured together in an array, e.g., at each array location, there is an RFID reader and a camera. In another arrangement, selected locations have an RFID reader and a camera.

Figure 6:
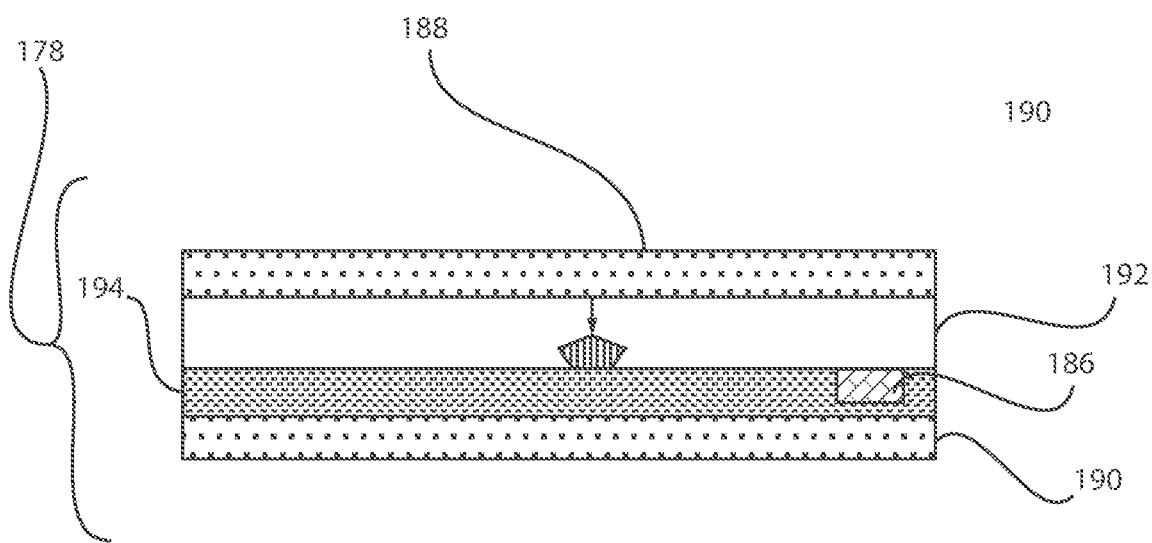
FIG. 6 depicts a side cross-sectional view of an exemplary embodiment of an object to be tracked in a two dimensional space that has an RFID tag, a light emitting source, and the circuitry to power them, in accordance with the present principles.

FIG. 6 depicts an object 178 including an RFID tag 186 and an illuminating light source 188 in accordance with an embodiment of the present principles. Object 178 is comprised of RFID circuit layer 194 which includes the circuitry for operating RFID tag 186 and illuminating light source 188. For example, the RFID circuit layer 194 may be provided with an integrated circuit for storing and processing information, for modulating and demodulating a radio-frequency (RF) signal, collecting DC power from the signal transmitted by the RFID reader signal, and an antenna for receiving and transmitting the signal. RFID circuit layer 194 also powers the light emitting source, which in one embodiment, may be a light emitting diode.

Object 178 further includes an optically transparent encapsulating layer 192 that provides a light guide to propagate the light emitted from the light emitting source 188. The optically transparent encapsulating layer may be made from any material that freely passes light, such as a suitable thermoplastic material.

The object structure is provided with encapsulating layers 190 on its outer sides, e.g., its upper and lower sides, which encapsulates the RFID circuit layer 194, the RFID tag 186, the optically transparent encapsulating layer 192 and the light emitting source 188. The encapsulating layers 190 should protect the interior components of the object 178 while allowing light emitted by the light emitting source 188 to pass freely through the object, to allow the light to be visually observed, e.g., visually observed by the cameras 180.

Referring to FIG. 7, an exemplary method 200 of tracking objects in a two-dimensional space, in accordance with an embodiment of the present principles, is described. Part or all of method 200 may be performed by systems 100 and 140 of FIG. 1 and FIG. 2, and the array that is shown in FIG. 3, FIG. 4 and FIG. 5.

Initially, tracking devices may be configured in an array to track a two-dimensional space in which objects tagged with identifying information may move about the space, such as described in relation to FIGS. 3, 4 and 5. In one embodiment, one or more of the tracking devices in the array have object reading ranges that overlap object reading ranges of at least one closest neighboring tracking device. The identifying information tagged to the object may be included in RFID tags that transmit unique identifying data to the tracking devices.

In block 210, a first group of tracking devices in the array is activated to read the identifying data of the objects located within the reading ranges of the tracking devices of the group. As indicted, the identifying data may be an RFID tag and the tracking devices may be RFID readers that are activated as a first group. The tracking devices of the first group may not have reading ranges that overlap with each other.

In block 215, a second group of tracking devices in the array is activated to read the identifying data of objects located within the reading ranges of the tracking devices of the second group. The tracking devices of the second group may not have reading ranges that overlap with each other, and the tracking devices of the first group and the tracking devices of the second group may be dissimilar, e.g., there are no tracking devices common to each group. As indicted, the identifying data may be an RFID tag and the tracking devices may be RFID readers that are activated as a second group.

In block 220, objects read by each tracking device of the first group are compared to the objects read by each tracking device of the second group. Objects that are read by two or more tracking devices, e.g., tracking devices of the first group and tracking devices of the second group, are identified.

In block 225, the locations of the objects in the two dimensional space read by two or more tracking devices, based on the locations and reading ranges of the tracking devices that read the objects, are determined. In one embodiment, the object may be determined to be at location that is at the mean distance between the RFID readers that read the tag.

Figure 8:
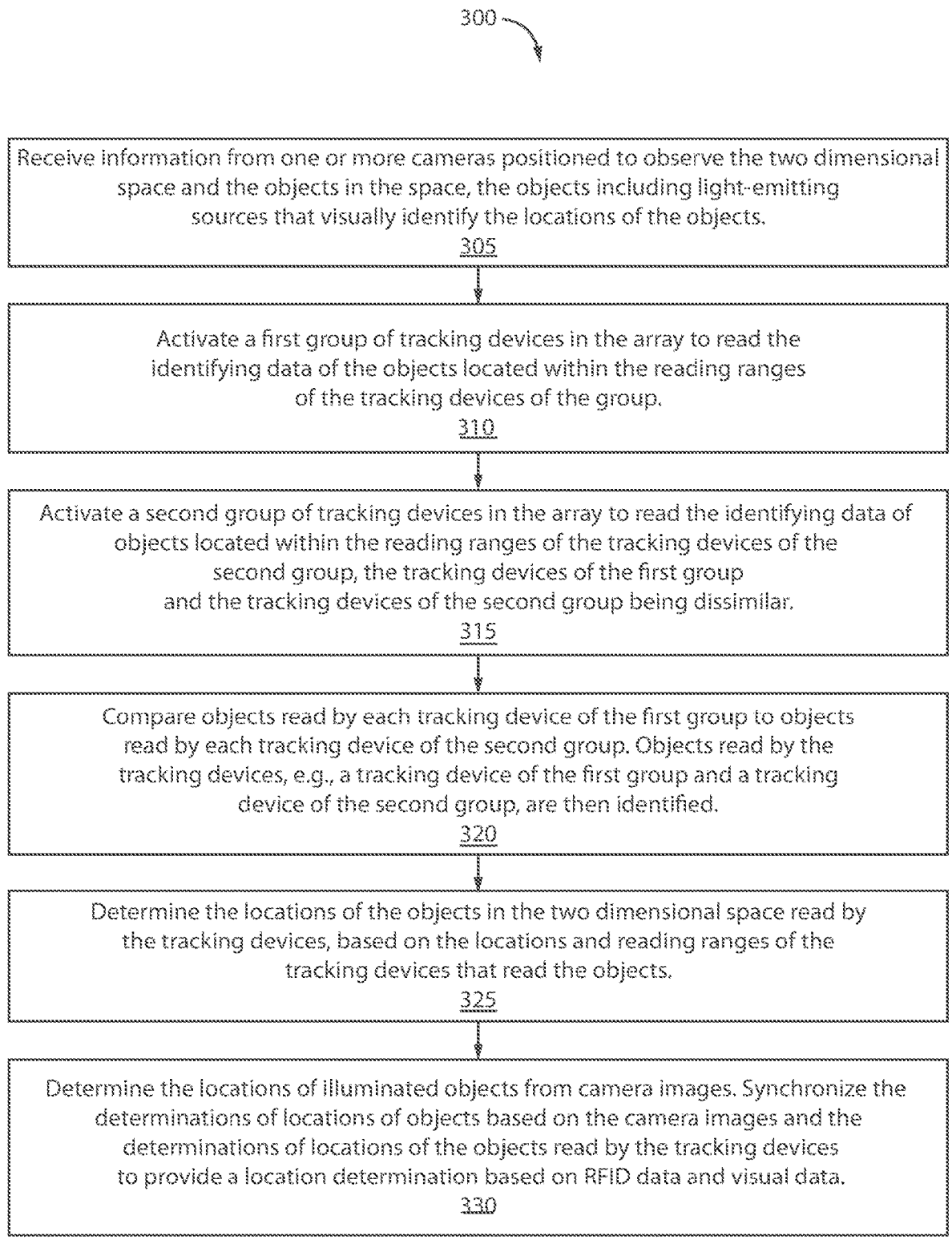
FIG. 8 is a block/flow diagram depicting another exemplary embodiment of a method for tracking objects in a two dimensional space in accordance with the present principles.

FIG. 8 describes another embodiment of a method 300 of tracking objects in a two-dimensional space in accordance with the present principles. The actions taken in blocks 310, 315, 320 and 325 respectively correspond to the actions taken in blocks 210, 215, 220 and 225 of the block/flow diagram of FIG. 7, and as described above in relation to the method 200. The discussion of the actions in these blocks is relied on herein. The method of FIG. 8 may be practiced in accordance with the array of FIG. 5 and the system 140 of FIG. 2.

In block 305, information is received from one or more cameras positioned to observe the two-dimensional space and the objects in the space, the objects including a light emitting source that visually identify the location of the objects. Visual markings on the table may be mapped out in advance, which may locate the objects with higher accuracy by correlating light emissions to the visual markings.

In block 330, determinations of the locations of illuminated objects are made from camera images. The determinations of locations of objects based on the camera images and the determinations of the locations of the objects read the tracking devices are synchronized to provide a location determination based on RFID data and visual data.

Localization using a multiple-camera system using simultaneous observations can be enabled to locate objects at an accuracy of about an inch or better. The determination from the camera image is synchronized with the determined locations of the objects in the two dimensional space read by two or more tracking devices, based on the locations and reading ranges of the tracking devices that read the objects.

Tracking objects in a two-dimensional space in accordance with the described embodiments in accordance with the present principles offers several advantages. Information on the locations of objects may be obtained in real time, with precision and accuracy. This permits the manager of a facility, such as a gaming facility, to ascertain that the objects such as gaming chips, which are exchangeable for an equivalent monetary value, are genuine and have not been tampered with or not counterfeited.

Figure 9:
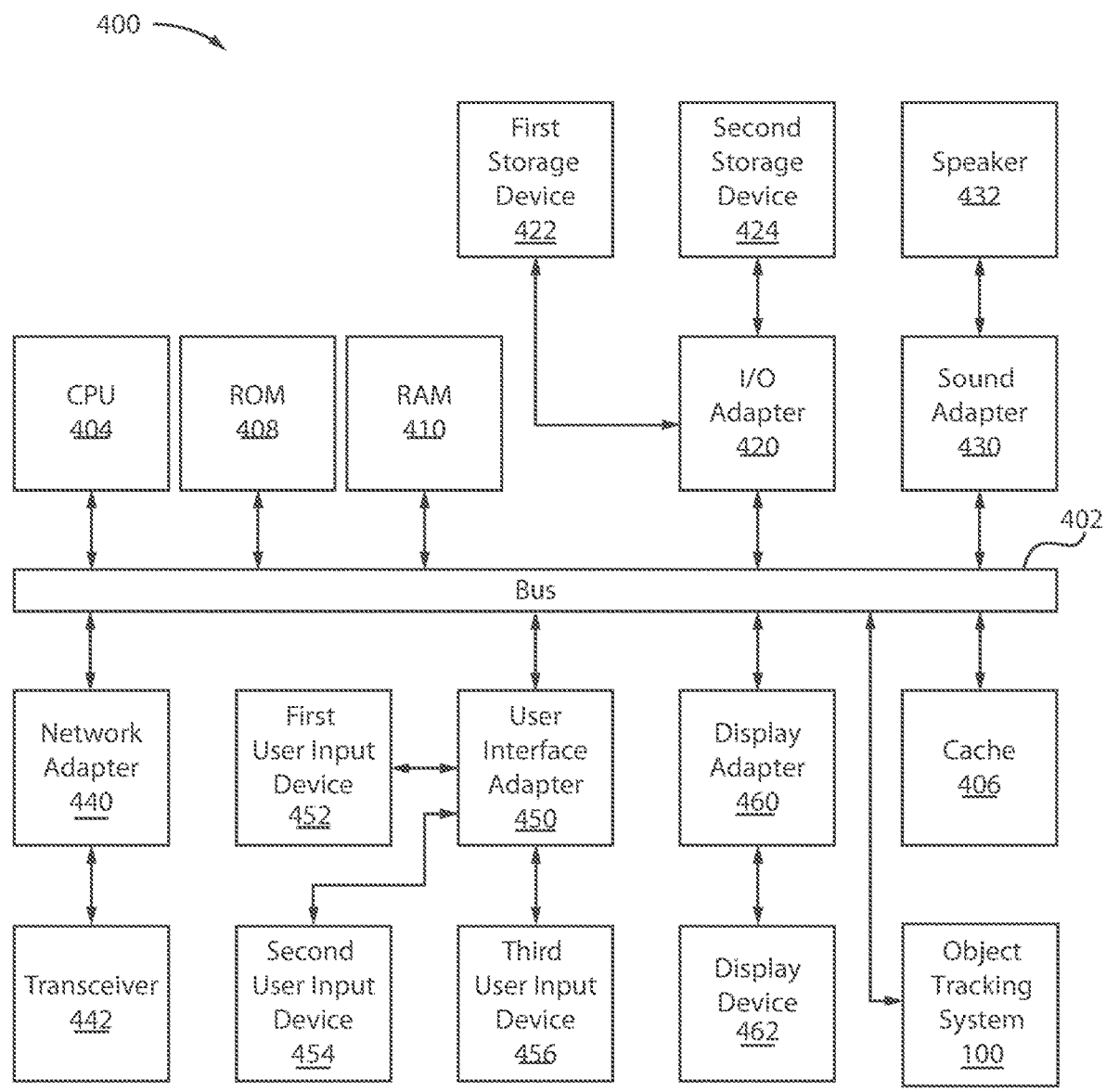
FIG. 9 depicts an exemplary embodiment of a processing system in operative communication with an exemplary embodiment of an object tracking system in accordance with the present principles.

Referring to FIG. 9, an exemplary processing system 400 to which the present principles may be applied is shown. The processing system 400 includes at least one processor (CPU) 404 operatively coupled to other components via a system bus 402. Object tracking system 100 is operatively coupled to the system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are also operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454 and 456 can be any of a keyboard, a mouse, a keypad, an image capture device, a motion sensing device, a microphone, a device incorporating the functionality of at least two of the preceding devices, and so forth. Of course, other types of input devices can also be used, while remaining consistent with the present principles. The user input devices 452, 454, and 456 can be the same type of user input device or different types of user input devices. The user input devices 452, 454, and 456 are used to input and output information to and from system 400. Further, RFID readers 464 of the exemplary object tracking system 100 may be operatively coupled to the system bus 402.

The processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 400 are readily contemplated by one of ordinary skill in the art given the teachings of the present principles provided herein.

While the present disclosure includes a detailed description on cloud computing, it should be understood that implementation of the subject matter described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
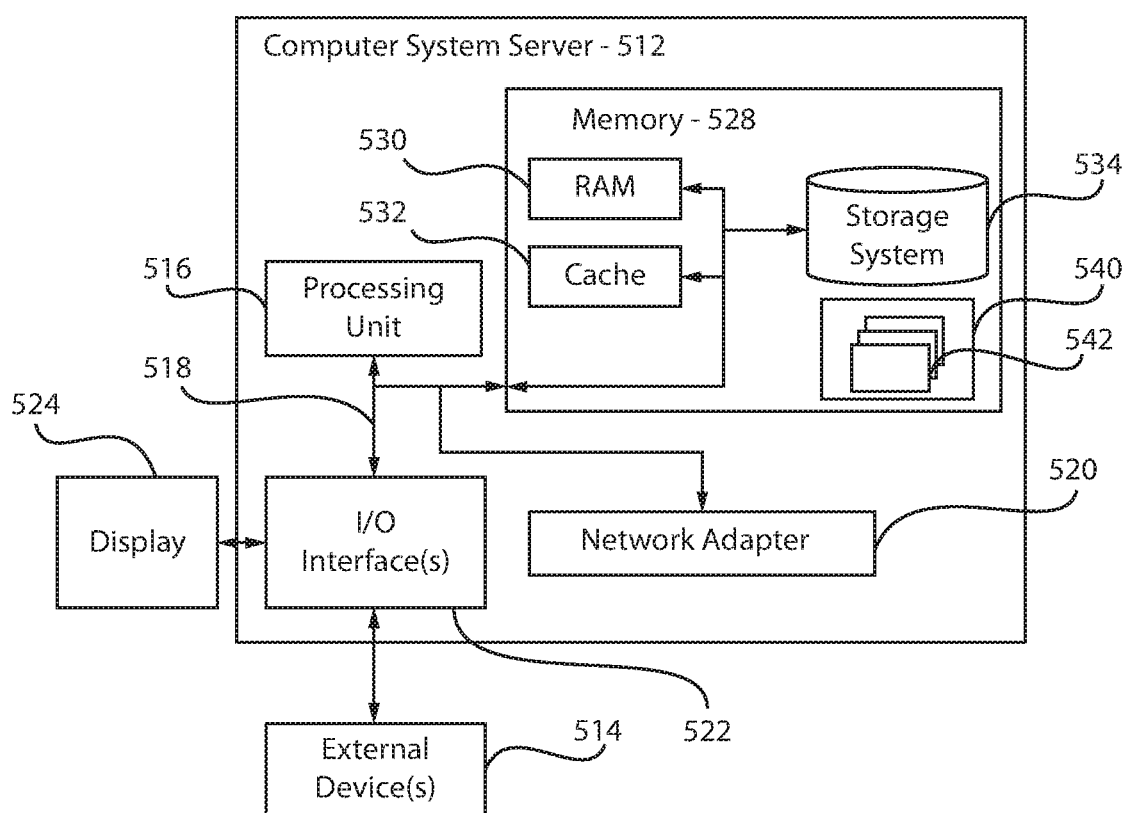
FIG. 10 is a block diagram depicting an exemplary cloud computing node in accordance with an embodiment of the present principles.

Referring now to FIG. 10, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to: microcode, device drivers, redundant processing units, external disk drive arrays, RAID systems, tape drives, and data archival storage systems, etc.

Figure 11:
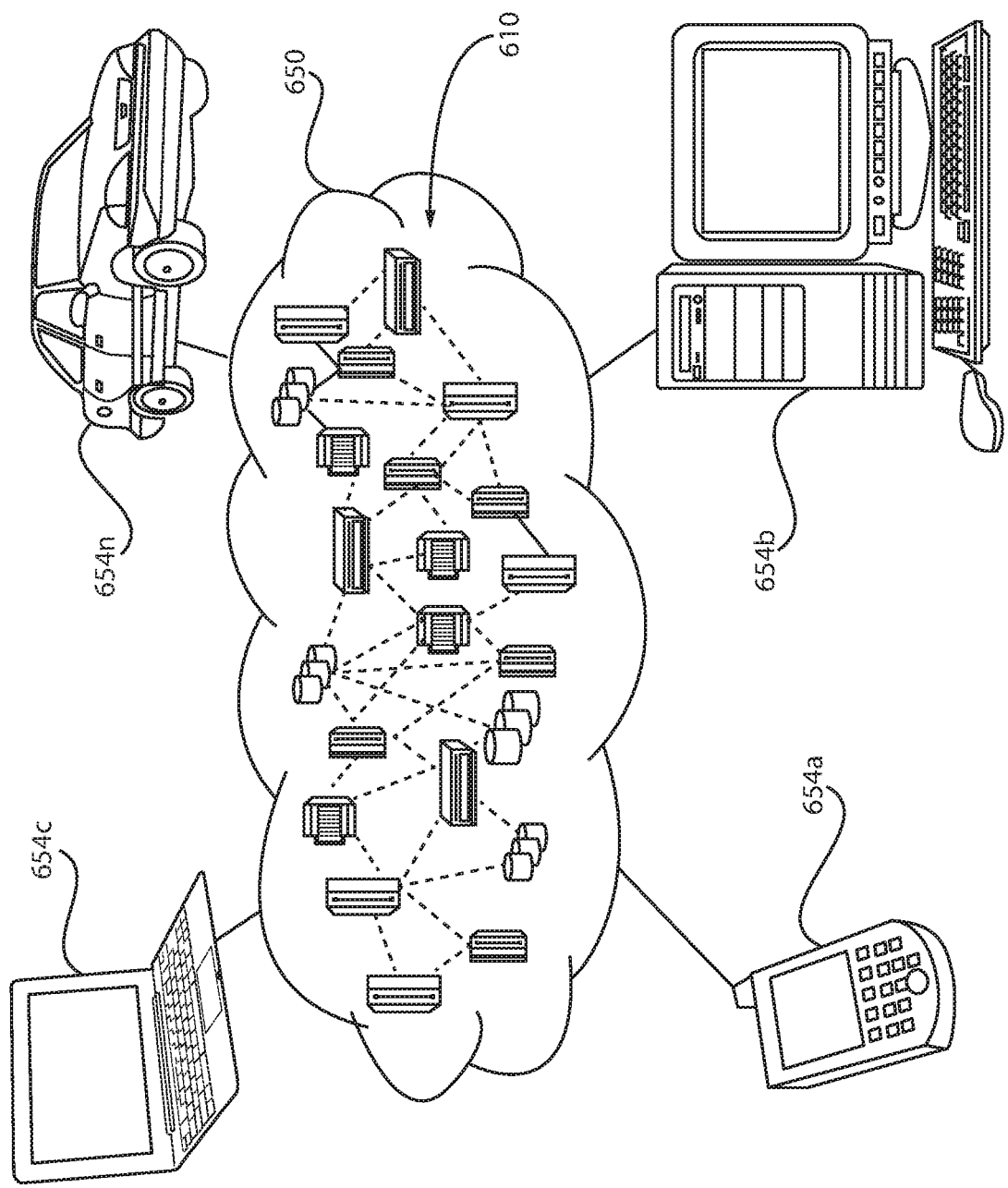
FIG. 11 is a block diagram depicting an exemplary cloud computing environment in accordance with an embodiment of the present principles.

Referring now to FIG. 11, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 11 are intended to be illustrative only and that computing nodes 610 and cloud computing environment 650 can communicate with any type of computerized device over any type of network and/or network addressable connection (e.g., using a web browser).

Figure 12:
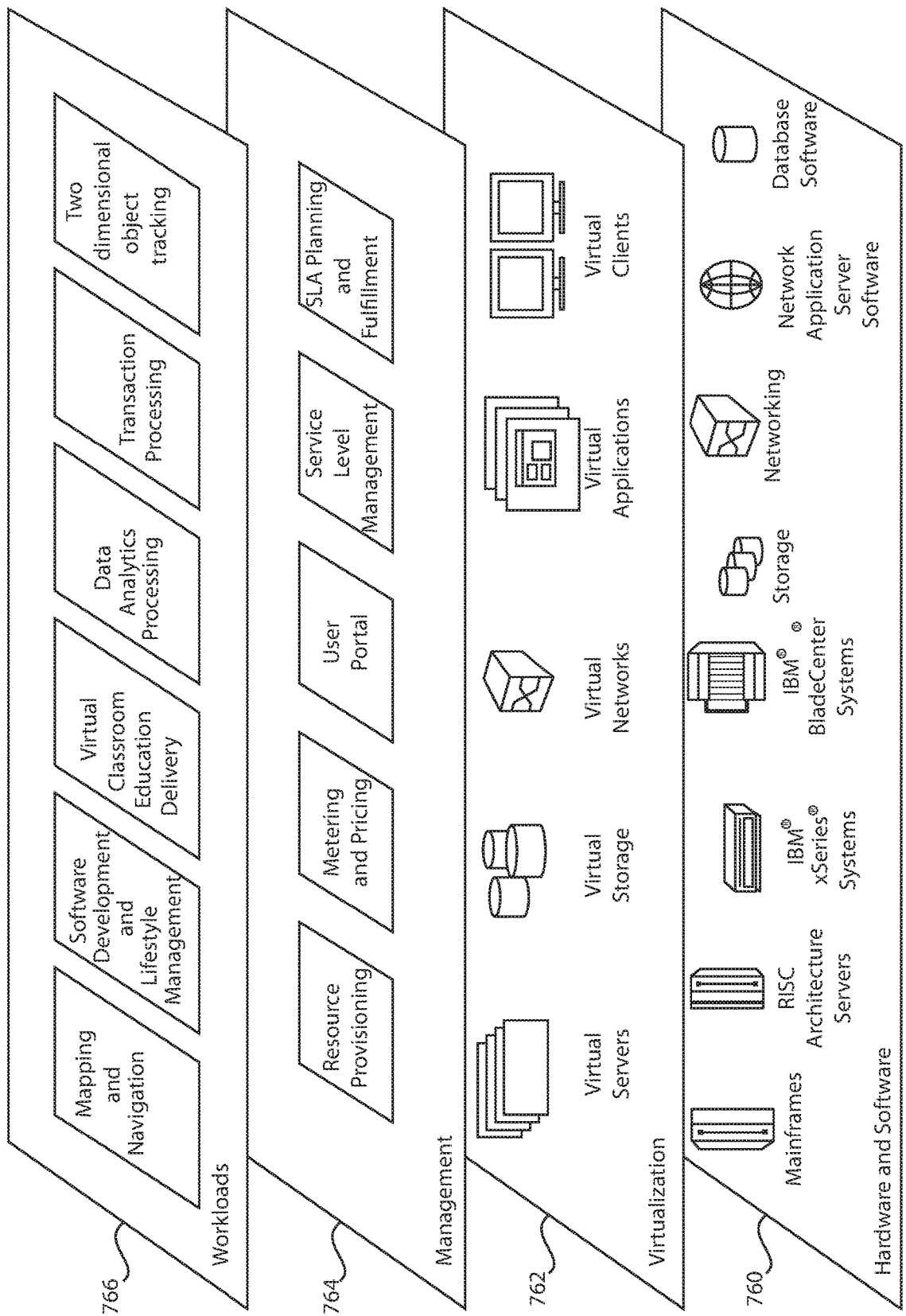
FIG. 12 is a block diagram depicting exemplary abstraction model layers, in accordance with an embodiment of the present principles.

FIG. 12 shows a set of functional abstraction layers provided by cloud computing environment 650. It should be understood in advance that the components, layers, and functions shown in FIG. 12 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and two-dimensional object tracking.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method of tracking objects in a two-dimensional space (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of tracking tagged objects in a two-dimensional space, comprising:
sequentially activating a plurality of tracking devices located underneath a horizontal surface of the two-dimensional space disposed above ground, including sequentially activating:
first tracking devices of the plurality of tracking devices that read tagged objects on the horizontal surface that are within reading ranges of the first tracking devices; and
second tracking devices of the plurality of tracking devices that read tagged objects on the horizontal surface that are within reading ranges of the second tracking devices;
comparing data collected from each of the plurality of tracking devices underneath the horizontal surface to identify that at least a given one of the tagged objects on the horizontal surface has been read by at least two of the plurality of tracking devices underneath the horizontal surface; and
determining a location of the given one of the tagged objects on the horizontal surface based on the locations of the at least two tracking devices underneath the horizontal surface that read the given one of the tagged objects on the horizontal surface.

2. The method of claim 1, wherein the determining of the location of the given one of the tagged objects comprises designating the given one of the tagged objects as being at a mean distance between the at least two tracking devices that read the given one of the tagged objects.

3. The method of claim 1, wherein the first tracking devices and second tracking devices have reading ranges that overlap the reading ranges of neighboring tracking devices.

4. The method of claim 1, wherein no common tracking devices exist among the first tracking devices and second tracking devices.

5. The method of claim 1, wherein the tracking devices include radio-frequency identification reading devices and the tagged objects include radio-frequency identification tags, and wherein the collected data comprises identity data that is unique to the radio-frequency identification tag of the given one of the tagged objects.

6. The method of claim 1, further comprising receiving information from cameras positioned to take images of the tagged objects in the two-dimensional space.

7. The method of claim 6, wherein the tagged objects include light-emitting sources that visually identify the locations of the tagged objects, and the method further comprises synchronizing visual identifications of the location of the given one of the tagged objects determined based on the camera image of the given one of the tagged objects with the determined location of the given one of the tagged objects read by the tracking devices, wherein visual information-including the determined location of the given one of the tagged objects is provided.

8. The method of claim 7, wherein the light emitting sources emit light in a pattern that is individual to each of the tagged objects.

9. A system for tracking tagged objects in a two-dimensional space, comprising:
a memory device for storing program code; and
at least one processor device operatively coupled to the memory device and configured to execute program code stored on the memory device to:
sequentially activate a plurality of tracking devices located underneath a horizontal surface of the two-dimensional space disposed above ground, including sequentially activating:
first tracking devices of the plurality of tracking devices that read tagged objects on the horizontal surface that are within reading ranges of the first tracking devices; and second tracking devices of the plurality of tracking devices that read tagged objects on the horizontal surface that are within reading ranges of the second tracking devices;

compare data collected from each of the plurality of tracking devices underneath the horizontal surface to identify that at least a given one of the tagged objects on the horizontal surface has been read by at least two of the plurality of tracking devices underneath the horizontal surface; and determine a location of the given one of the tagged objects on the horizontal surface based on the locations of the at least two tracking devices underneath the horizontal surface that read the given one of the tagged objects on the horizontal surface.

10. The system of claim 9, wherein each tracking device is configured to stamp a time at which the tracking device read the tagged objects.

11. The system of claim 9, wherein the at least one processor device is configured to store information selected from the group consisting of:
locations of each tracking device;
distances of each tracking device from its nearest neighboring readers;
distances of each tracking device from each of the other readers;
the reading range of each tracking device; and
and combinations thereof.

12. The system of claim 9, wherein the at least one processor device is configured to sequentially activate the first and second tracking devices in a coordinated sequence.

13. The system of claim 9, wherein the at least one processor device is configured to determine the location of the given one of the tagged objects by designating the given one of the tagged objects as being at a mean distance between the at least two tracking devices that read the given one of the tagged objects.

14. The system of claim 9, wherein each tracking device is configured to have a reading range that overlaps the reading ranges of neighboring tracking devices.

15. The system of claim 9, wherein the system further includes cameras that take images of the tagged objects in the two-dimensional space, and wherein the at least one processor device is further configured to determine the location of the given one of the tagged objects based on the image of the given one of the tagged objects.

16. The system of claim 15, wherein the tagged objects include illuminating light sources.

17. The system of claim 16, wherein the at least one processor device is configured to execute program code stored on the memory device to synchronize the location of the given one of the tagged objects based on the image of the given one of the tagged objects with the determined location of the given one of the tagged objects to provide visual information including the determined location of the given one of the tagged objects.

18. The system of claim 17, wherein the given one of the tagged objects further includes a circuit that simultaneously activates the radio-frequency identification tags and the illuminating light sources when the given tagged object is in range of a tracking device.

19. A computer program product comprising a non-transitory computer readable storage medium having program instructions embodied therewith, the program instructions being executable by a computer to cause the computer to perform a method for tracking tagged objects in a two-dimensional space, the method comprising:

sequentially activating a plurality of tracking devices located underneath a horizontal surface of the two-dimensional space disposed above ground, including sequentially activating:
first tracking devices of the plurality of tracking devices that read tagged objects on the horizontal surface that are within reading ranges of the first tracking devices; and
second tracking devices of the plurality of tracking devices that read tagged objects on the horizontal surface that are within reading ranges of the second tracking devices;

comparing data collected from each of the plurality of tracking devices underneath the horizontal surface to identify that at least a given one of the tagged objects on the horizontal surface has been read by at least two of the plurality of tracking devices underneath the horizontal surface; and determining a location of the given one of the tagged objects on the horizontal surface based on the locations of the at least two tracking devices underneath the horizontal surface that read the given one of the tagged objects on the horizontal surface.

20. The computer program product of claim 19, wherein the determining of the location of the given one of the tagged objects comprises designating the given one of the tagged objects as being at a mean distance between the at least two tracking devices that read the given one of the tagged objects.

* * * * *